(12) United States Patent
Peng (10) Patent No.: US 11,624,383 B2
(45) Date of Patent: Apr. 11, 2023

(54) ASSEMBLED BODY USING FITTINGS

(71) Applicant: HANGZHOU LEGGY HORSE TECH. CO., LTD., Hangzhou (CN)

(72) Inventor: Yalan Peng, Hangzhou (CN)

(73) Assignee: HANGZHOU LEGGY HORSE TECH. CO., LTD., Hangzhou (CN)

( * ) Notice: Subject to any disclaimer, the term of this patent is extended or adjusted under 35 U.S.C. 154(b) by 595 days.

(21) Appl. No.: 16/798,446

(22) Filed: Feb. 24, 2020

(65) Prior Publication Data

US 2020/0191181 A1 Jun. 18, 2020

Related U.S. Application Data

(63) Continuation of application No. 15/017,630, filed on Feb. 7, 2016, now abandoned, which is a continuation of application No. PCT/CN2014/083710, filed on Aug. 5, 2014.

(30) Foreign Application Priority Data

Aug. 8, 2013 (CN) .......................... 201310343731.1

(51) Int. Cl.
| | |
|---|---|
| *F16B 5/00* | (2006.01) |
| *A47F 5/10* | (2006.01) |
| *F16B 12/10* | (2006.01) |
| *F16B 12/46* | (2006.01) |
| *F16B 12/02* | (2006.01) |
| *G09F 15/00* | (2006.01) |
| *F16B 5/06* | (2006.01) |

(52) U.S. Cl.
CPC .............. *F16B 5/0004* (2013.01); *A47F 5/10* (2013.01); *F16B 12/02* (2013.01); *F16B 12/10* (2013.01); *F16B 12/46* (2013.01); *G09F 15/0006* (2013.01); *F16B 5/0614* (2013.01); *G09F 15/0068* (2013.01)

(58) Field of Classification Search
CPC ........ F16B 5/0004; F16B 12/02; F16B 12/10; F16B 12/46; F16B 5/0614; A47F 5/10; G09F 15/0006; G09F 15/0068
See application file for complete search history.

(56) References Cited

U.S. PATENT DOCUMENTS

| | | | | | |
|---|---|---|---|---|---|
| 3,158,961 | A | * | 12/1964 | Hawkins .................. | E04D 3/08 52/468 |
| 3,770,245 | A | * | 11/1973 | Murdock ................ | E04H 17/16 256/65.08 |
| 3,854,269 | A | * | 12/1974 | Hancock ............... | F16B 5/0607 52/282.1 |

(Continued)

FOREIGN PATENT DOCUMENTS

JP 61113675 U * 7/1986

*Primary Examiner* — Ko H Chan (57) ABSTRACT

Provided is an assembled body assembled by splicing frames through male joint and female interface. The male joint includes a stopping edge and a locating protrusion, where the stopping edge extends in a first direction and the locating protrusion extends in a second direction orthogonal to the first direction. The female interface includes a first U-shape recess, and an inner surface of the recess is provided with a stopping groove and a locating slot adapted for retaining the stopping edge and the locating protrusion respectively.

13 Claims, 5 Drawing Sheets

(56) References Cited

U.S. PATENT DOCUMENTS

| | | | | |
|---|---|---|---|---|
| 5,200,240 A * | 4/1993 | Baker | ............... | E04F 11/1853 |
| | | | | 52/690 |
| 5,341,610 A * | 8/1994 | Moss | ............... | E04H 1/1205 |
| | | | | 52/80.1 |
| 5,520,477 A * | 5/1996 | Fink | ............... | F16B 5/0028 |
| | | | | 403/231 |
| 8,042,698 B2 * | 10/2011 | Kim | ............... | F16M 13/02 |
| | | | | 211/78 |
| 9,435,136 B2 * | 9/2016 | Payne | ............... | E04H 17/161 |
| 2014/0030017 A1 * | 1/2014 | Luo | ............... | A47B 47/042 |
| | | | | 403/375 |

* cited by examiner

ASSEMBLED BODY USING FITTINGS

CROSS-REFERENCE TO RELATED APPLICATIONS

This application is a continuation of U.S. patent application Ser. No. 15/017,630, which is a continuation of International Patent Application No. PCT/CN2014/083710 with an international filing date of Aug. 5, 2014, designating the United States, now pending, and further claims priority benefits to Chinese Patent Applications No. 201310343731.1, filed Aug. 8, 2013. The contents of all of the aforementioned applications, including any intervening amendments thereto, are incorporated herein by reference.

TECHNICAL FIELD

The present invention relates to the field of assembly, and particularly to an assembled body using fittings.

BACKGROUND

The shape of the existing assembled bodies (such as photo frames, picture frames and display frames) cannot be changed again once made, regardless of specifications and sizes. However, irregular positions are often presented in a number of display and exhibition spaces, and in order to adapt to the positions, the assembled bodies are made according to the irregular positions, which brings inconvenience to the transportation and arrangement; and when the assembled bodies are made into small specifications, the assembled bodies are arranged and installed one by one, and the correlation is lacked to one another, thereby, the installation is inconvenient.

SUMMARY OF THE INVENTION

The purpose of the present invention is to provide an assembled body using fittings which is convenient for transportation and can be flexibly arranged according to site requirements.

In order to achieve the above purpose, the assembled body using fittings of the present invention is assembled into required shapes by splicing male joints and female interfaces.

As a preferred technical measure: the male joint includes a first group of two traverse plates parallel to each other and an upright plate connecting to the two traverse plates in a direction perpendicular to the traverse plates; a stopping edge and a locating protrusion are provided on an outer surface of each of the two traverse plates, the stopping edge extends in a first direction parallel to a ridge where the traverse plates intersect with the upright plate, and the locating protrusion extends in a second direction orthogonal to the first direction. The female interface includes two horizontal plates parallel to each other and a vertical plate connecting to the two horizontal plates in a direction perpendicular to the horizontal plates, the two horizontal plates and the vertical plate form a first U-shape recess, and an inner surface of each of the two horizontal plates is provided with a stopping groove and a locating slot adapted for retaining the stopping edge and the locating protrusion respectively. The male joint is adapted to engage with the female interface when the two traverse plates are inserted into the U-shape recess of the female interface, the stopping edge is located in the stopping groove, and the locating protrusion is located in the locating slot.

As a preferred technical measure: the male joints are arranged on male connecting parts, and the female interfaces are arranged on female connecting parts. Specifically, the male connecting parts and the female connecting parts are assembled on two adjacent assembled bodies respectively, and the assembly of the two adjacent assembled bodies is realized by splicing the male joints of the male connecting parts and the female interfaces on the female connecting parts. Or, the male connecting parts are assembled on the two adjacent assembled bodies respectively, the assembly of the two adjacent assembled bodies is realized by splicing connectors and the male connecting parts, the connectors are provided with the two female interfaces, and the two female interfaces of the connectors are spliced with the male joints of the male connecting parts respectively, thereby realizing the assembly of the two adjacent assembled bodies. Or, the female connecting parts are assembled on the two adjacent assembled bodies respectively, the assembly of the two adjacent assembled bodies is realized by splicing the connectors and the female connecting parts, the connectors are provided with the two male joints, and the assembly of the two adjacent assembled bodies is realized by splicing the two male joints of the connectors and the female interfaces of the female connecting parts. Especially, the connectors are in a hinged shape.

As a preferred technical measure: the male joints are arranged on the male connecting parts, the female interfaces are arranged on the female connecting parts, the male connecting parts and the female connecting parts are assembled on the two adjacent assembled bodies respectively, the assembly of the two adjacent assembled bodies is realized by splicing the connectors and the male connecting parts and the female connecting parts, the connectors are provided with the male joints and the female interfaces, the male joints of the connectors are spliced with the female interfaces of the female connecting parts, and the female interfaces of the connectors are spliced with the male joints of the male connecting parts. Especially, the connectors are in the hinged shape.

As a preferred technical measure: the male connecting parts or/and the female connecting parts are one of a straight plate shape, a break angle shape and a rounded angle shape. The connectors are one of the straight plate shape, the break angle shape and the rounded angle shape. The male connecting parts or/and the female connecting parts are provided or matched with accessories.

As a preferred technical measure: the assembled body comprises support bodies assembled by the male joints and female interfaces and the assembled bodies. Specifically, the support bodies are column-shaped, and the assembled bodies are radially assembled around the column-shaped support bodies. Further, the lower end of the support bodies is rotatably connected to a base. Or, the support bodies are vase-shaped, and the assembled bodies are assembled between the support bodies; and further, the support bodies are spliced through the corresponding connector.

In order to achieve the purpose, the assembled body using fittings of the present invention can also be used for assembled the assembled bodies into the required shapes with the connector.

Further, the connectors are provided with two inserting openings, and the edges of the two adjacent assembled bodies are assembled in the two inserting openings respectively, thereby realizing the assembly.

The assembled body using fittings has the beneficial effects that: the assembled bodies are assembled into the required shapes by splicing the male joints and female interfaces; therefore, the assembled bodies can be arranged into the required shapes according to the site shape; and the assembled body is disassembled while transportation, so that the space occupation is small.

In which, label declaration is as follows:
01A, 01B, 01C, 01D-male connecting parts;
11-male joint, 12-bulge, 13-stopping edge, 14-locating protrusion;
02A, 02B, 02C, 02D-female connecting parts;
21-female interface, 22-recess, 23-stopping groove, 24-locating slot;
03A, 03B, 03C, 03D, 03E-connectors, 31-inserting opening;
04-accessories;
05A, 05B-support bodies, 51-base;
06-assembled bodies;
07-sucker.

DETAILED DESCRIPTION OF EMBODIMENTS

Further description is made for the present invention in combination with the drawings of the description.

Figure 1:
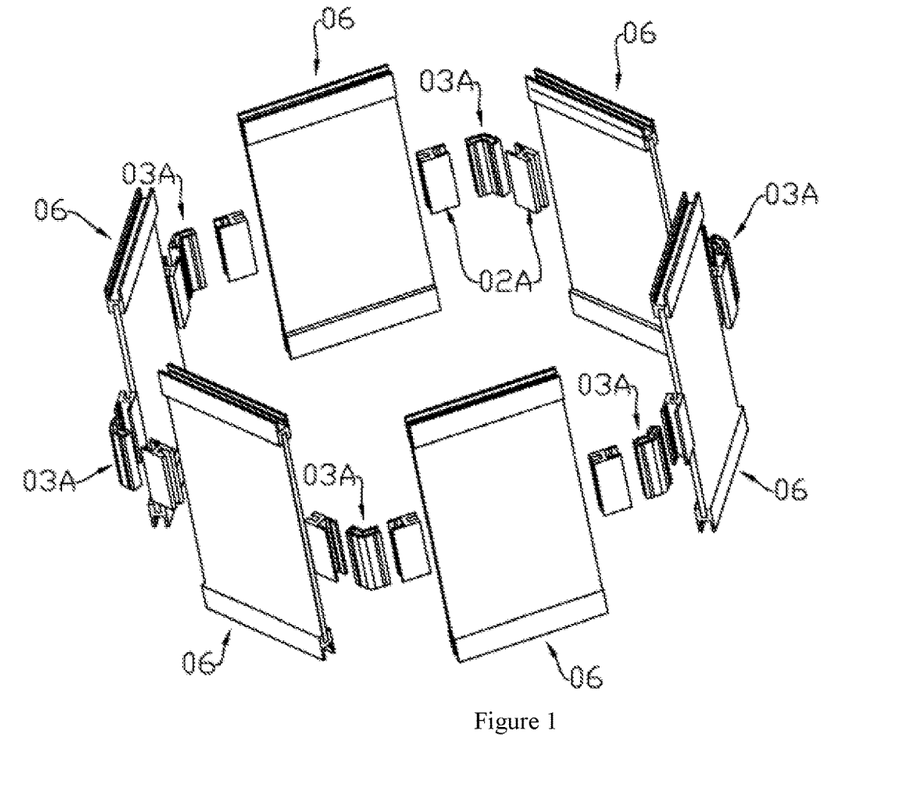
FIG. 1 is a structural diagram of an assembled body using fittings of the present invention.
Figure 2:
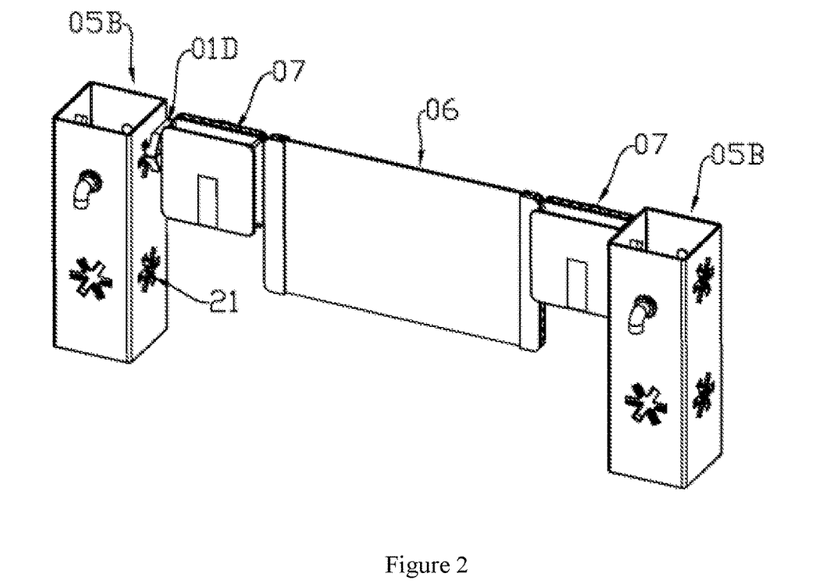
FIG. 2 is another structural diagram of an assembled body using fittings of the present invention.
Figure 3:
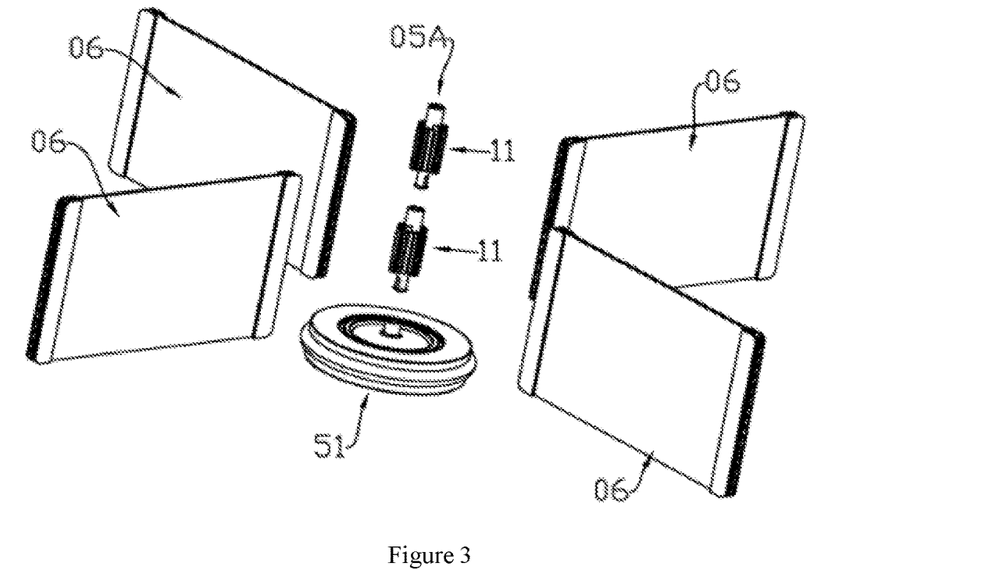
FIG. 3 is a third structural diagram of an assembled body using fittings of the present invention.
Figure 4:
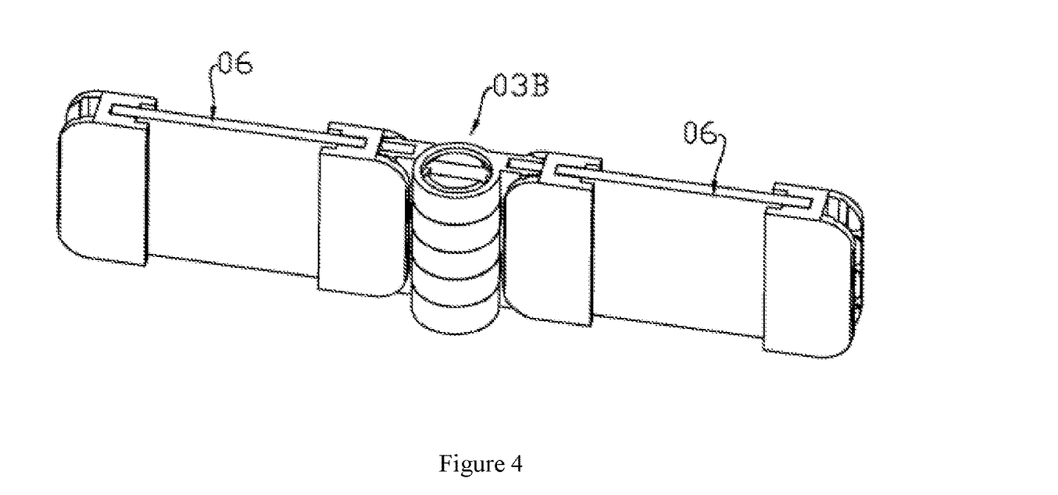
FIG. 4 is a fourth structural diagram of an assembled body using fittings of the present invention.
Figures 5, 6, 7:
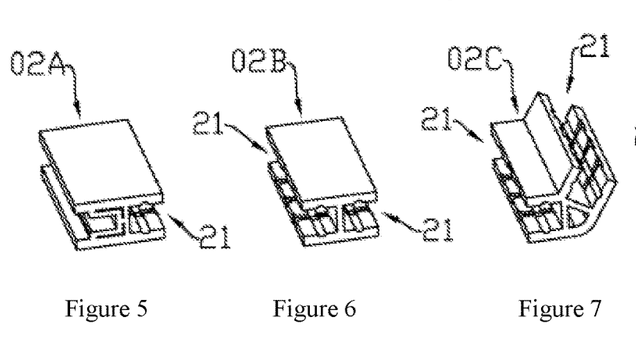
FIG. 5 is a diagram of one kind of female connecting part with a structure of the present invention.
FIG. 6 is a diagram of one kind of female connecting part with a structure of the present invention.
FIG. 7 is a diagram of one kind of female connecting part with a structure of the present invention.
Figure 8:
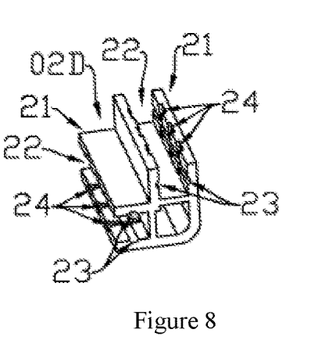
FIG. 8 is a diagram of one kind of female connecting part with a structure of the present invention.
Figure 9:
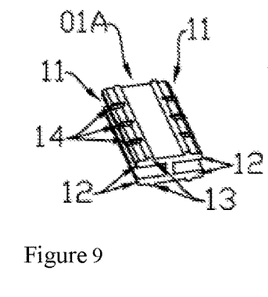
FIG. 9 is a diagram of one kind of male connecting part with a structure of the present invention.
Figures 10, 11:
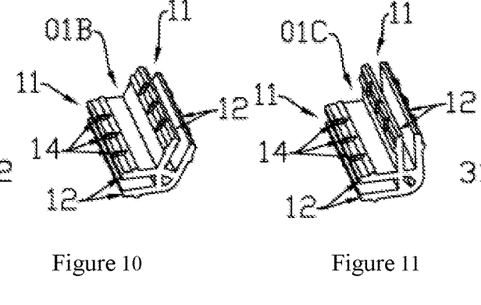
FIG. 10 is a diagram of one kind of male connecting part with a structure of the present invention.
FIG. 11 is a diagram of one kind of male connecting part with a structure of the present invention.
Figures 12, 13:
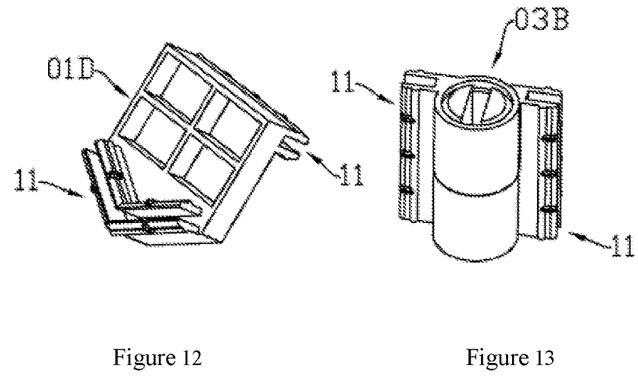
FIG. 12 is a diagram of one kind of male connecting part with a structure of the present invention.
FIG. 13 is a diagram of one connector of the present invention.

The assembled body using fittings of the present invention is assembled into the required shapes by splicing male joints and female interfaces. As shown in Figures, FIG. 1 is orthohexagonal, FIG. 2 is in a wall shape of a facade, FIG. 3 is radial, FIG. 4 is rotatable, and the situations shown in FIGS. 1-4 are arranged vertically, so that the assembly is convenient. The layout can be carried out in accordance with a spatial position: in the specific implementation, the whole assembled body can be adsorbed on a flat wall (such as glass wall, marble wall and the like, see FIG. 2) independently or in combination with a sucker 07 and other tools, thereby realizing the arrangement on the wall and strengthening the stability. The assembled body with a plurality of shapes and structural styles can be arranged into the required shape according to the site shape because the assembled bodies are assembled by splicing; and the assembled body is disassembled while transportation, so that the space occupation is small.

As the further improvement and supplement for the above technical solution, the present invention further comprises additional technical features involved in paragraphs below; and the additional technical features can be selected for the technical solution of the present invention according to the specific effect when implementing the present invention.

Firstly, see FIGS. 9-12. Male joints 11 are provided with a bulge 12, and a stopping edge 13 is arranged on the bulge 12; see FIGS. 5-8; a recess 22 is arranged on female interfaces 21, a stopping groove 23 is arranged on the inner wall of the recess 22, and the bulge 12 is inserted into the recess 22 and the stopping edge 13 is located in the stopping groove 23, thereby realizing the splicing of the male joints and the female interfaces. Further, see FIGS. 9-12. A locating protrusion 14 is arranged on the bulge 12. See FIGS. 5-8. A locating slot 24 is arranged on the inner wall of the recess 22, and the locating protrusion 14 is located in the locating slot 24 when the male joints 11 are spliced with the female interfaces 21, thereby facilitating the aligned splicing; and after splicing, an external force can be borne by the locating protrusion and the locating slot horizontally, thereby being suitable for the male joints and the female interfaces spliced together to realize the connection in a plurality of postures.

Secondly, the male joints 11 are arranged on the male connecting parts 01A, 01B, 01C and 01D; and the female interfaces 21 are arranged on the female connecting parts 02A, 02B, 02C and 02D. At this time, the assembled bodies can be assembled with the following ways: first, the male connecting parts and the female connecting parts are assembled on two adjacent assembled bodies respectively, and the assembly of the two adjacent assembled bodies is realized by splicing the male joints of the male connecting parts and the female interfaces on the female connecting parts. Second, the male connecting parts are assembled on the two adjacent assembled bodies respectively, the assembly of the two adjacent assembled bodies is realized by splicing connectors and the male connecting parts, the connectors are provided with the two female interfaces, and the two female interfaces of the connectors are spliced with the male joints of the male connecting parts respectively, thereby realizing the assembly of the two adjacent assembled bodies. The structural style of the connectors can refer to that of the female connecting parts. Third, the female connecting part 02A is assembled on the two adjacent assembled bodies 06 respectively, the assembly of the two adjacent assembled bodies is realized by splicing the connector 03A and the female connecting part 02A, the connector 03A is provided with the two male joints 11, and the assembly of the two adjacent assembled bodies is realized by splicing the two male joints of the connectors and the female interfaces of the female connecting parts (See FIG. 1). The structural style of the connectors can refer to that of the male connecting parts. In allusion to the second and the third situations, the connector 03B can also be in a hinged shape, so that the two assembled bodies can be relatively rotated through the connectors (see FIG. 4).

Thirdly, the male joints are arranged on the male connecting parts, the female interfaces are arranged on the female connecting parts, the male connecting parts and the female connecting parts are assembled on the two adjacent assembled bodies respectively, the assembly of the two adjacent assembled bodies is realized by splicing the connectors and the male connecting parts and the female connecting parts, the connectors are provided with the male joints and the female interfaces, and the male joints of the connectors are spliced with the female interfaces of the female connecting parts, and the female interfaces of the connectors are spliced with the male joints of the male connecting parts. Further, the connectors are in the hinged shape, so that the two assembled bodies can be relatively rotated through the connectors (see FIG. 4).

Fourthly, the male connecting parts or/and the female connecting parts are one of a straight plate shape (see FIG. 5, FIG. 6 and FIG. 9), a break angle shape (see FIG. 12) and a rounded angle shape (see FIGS. 7-8 and 10-11). The connectors are one of the straight plate shape, the break angle shape and the rounded angle shape. Thereby, the assembled bodies can be spliced into a plurality of shapes.

Figure 14:
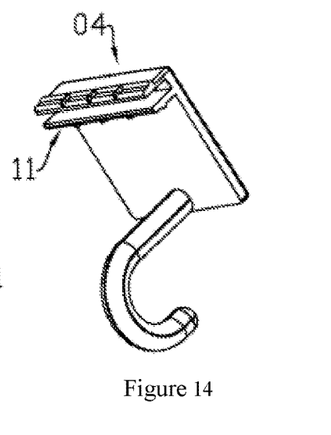
FIG. 14 is a diagram of one accessory of the present invention.
Figure 15:
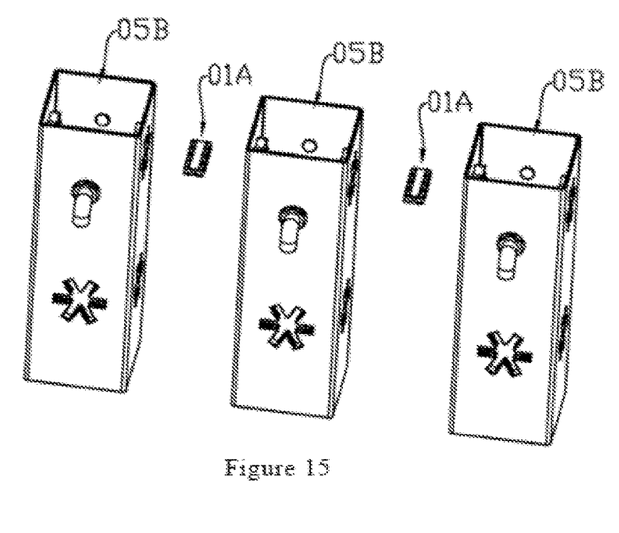
FIG. 15 is a diagram that the vase-shaped support bodies of the present invention are spliced to each other.

Fifthly, accessories are arranged on the male connecting parts or/and the female connecting parts; or accessories 04 are arranged on the male connecting parts or/and the female connecting parts. The accessories shown in FIG. 14 show a hook spliced with the female connecting parts, the hook is used for hanging a basket and other objects; and while the specific implementation, the accessories can be in other shapes and structural styles, and can also be spliced with the male connecting parts.

Sixthly, the assembled body comprises support bodies assembled by the male joints and female interfaces and the assembled bodies. Specifically, the support body 05A can be column-shaped, and the assembled bodies 06 are radially assembled around the column-shaped support bodies 05A (see FIG. 3). Further, the lower end of the support body 05A is rotatably connected to a base 51. Accordingly, the assembled bodies assembled on the support bodies can be rotated by virtue of the supporting bodies, thereby being convenient for seeing. The support body 05B can also be vase-shaped, and the assembled bodies 06 are assembled between the support bodies (see FIG. 2). Further, the vase-shaped support bodies can also be spliced through the corresponding connector.

Figure 16:
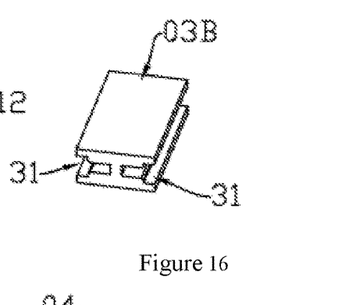
FIG. 16 is a kind of structural diagram of the connectors of the present invention for assembled the assembled bodies into the required shapes.
Figure 17:
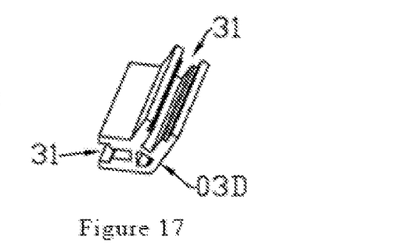
FIG. 17 is a kind of structural diagram of the connectors of the present invention for assembled the assembled bodies into the required shapes.
Figure 18:
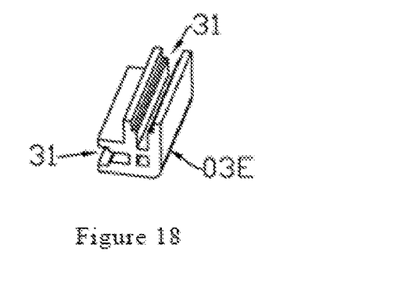
FIG. 18 is a kind of structural diagram of the connectors of the present invention for assembled the assembled bodies into the required shapes.

The assembled body using fittings of the present invention can also be assembled into the required shapes with the connector. Further, the connectors (see FIGS. 16-18) are provided with two inserting openings, and the edges of the two adjacent assembled bodies are assembled in the two inserting openings respectively, thereby realizing the assembly.

Figure 19:
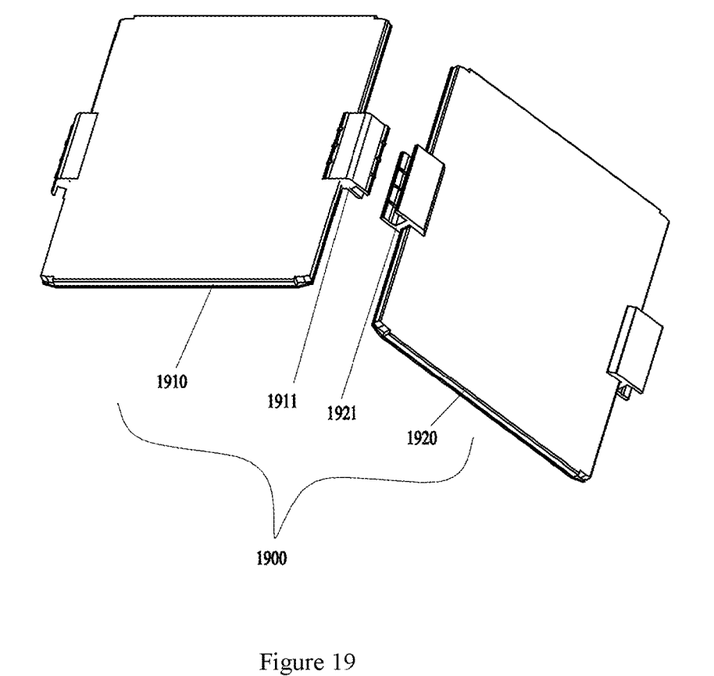
FIG. 19 is a structural diagram of an assembled body using fittings according to an embodiment of the present invention.

FIG. 19 is a structural diagram of an assembled body using fittings according to an embodiment of the present invention. According to this embodiment, the assembled body 1900 is assembled by splicing frames 1910 and 1920 through male joint 1911 and female interface 1921. The frames 1910 and 1920 are provided with the male joint 1911 and female interface 1921, respectively, and the frames 1910 and 1920 are assembled together by engaging the male joint 1911 and female interface 1921.

Figure 20:
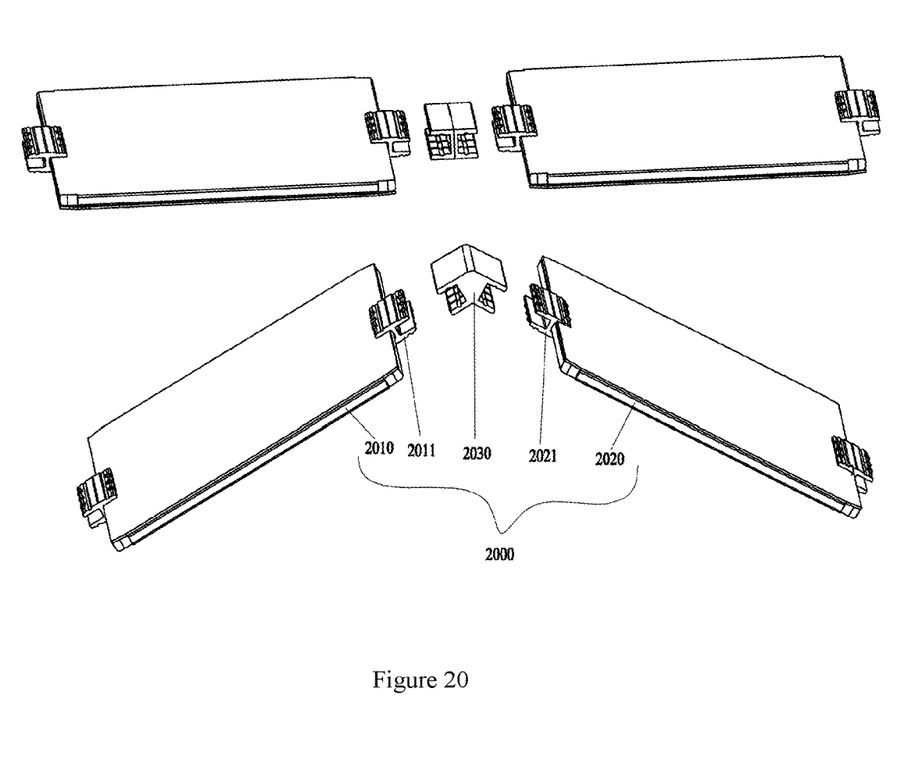
FIG. 20 is a structural diagram of an assembled body using fittings according to another embodiment of the present invention.

FIG. 20 is a structural diagram of an assembled body using fittings according to another embodiment of the present invention. According to this embodiment, the assembled body 2000 is assembled by splicing frames 2010 and 2020 through male joint 2011, male joint 2021, and a common female interface 2030. The frames 2010 and 2020 are provided with the male joint 2011 and male joint 2021, respectively, and the frames 2010 and 2020 are assembled together by engaging both the male joint 2011 and the male joint 2021 to the female interface 2030.

Figure 21:
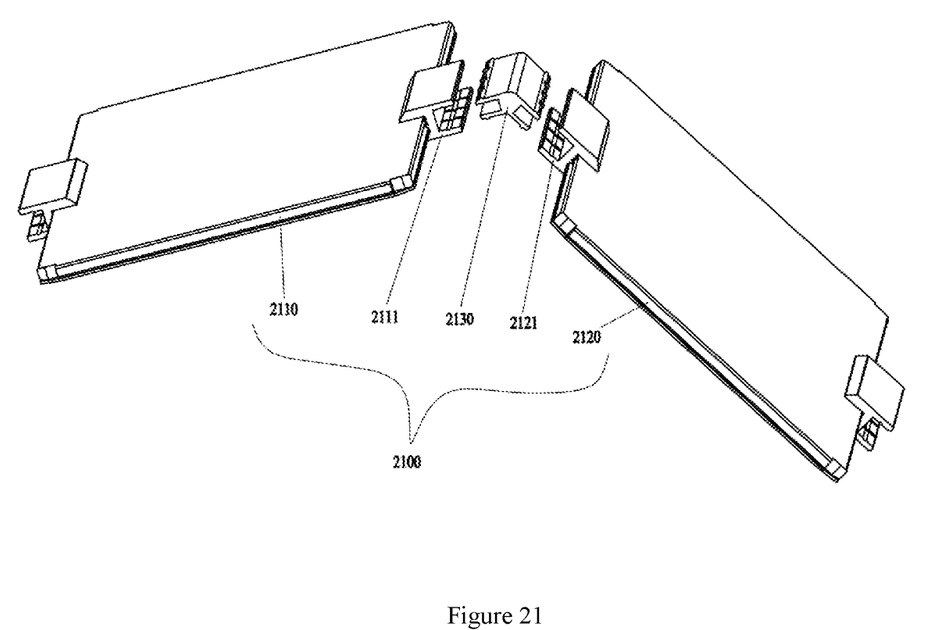
FIG. 21 is a structural diagram of an assembled body using fittings according to yet another embodiment of the present invention.

FIG. 21 is a structural diagram of an assembled body using fittings according to yet another embodiment of the present invention. According to this embodiment, the assembled body 2100 is assembled by splicing frames 2110 and 2120 through female interface 2111, female interface 2121, and a common male joint 2130. The frames 2110 and 2120 are provided with the female interface 2111 and the female interface 2121, respectively, and the frames 2110 and 2120 are assembled together by engaging both the female interface 2111 and the female interface 2121 to the male joint 2130.

The present invention shows the male connecting parts, the female connecting parts and the connectors with a plurality of different structural styles, and the plurality of structural styles have indicated the technical enlightenment of the male connecting parts and the female connecting parts. Therefore, in the specific implementation, the male connecting parts and the female connecting parts with more structural styles can be made according to the requirements. However, the assembled bodies shown in the Figure are rectangular; can also be in other shapes in the specific implementation, such as parallelogram, regular pentagon, regular hexagon and the like; and can also be a combination of a plurality of shapes. The purpose is to assemble the assembled bodies (including other decorative parts) by splicing into the required shapes, which belongs to the protection scope claimed in the present invention.

I claim:

1. An assembled body, comprising:
   frames;
   at least one male joint; and
   at least one female interface;
   wherein the assembled body is assembled by splicing the frames through the male joint and the female interface;
   the male joint comprises a first group of two traverse plates parallel to each other and an upright plate connecting to the two traverse plates in a direction perpendicular to the traverse plates; a stopping edge and a locating protrusion are provided on an outer surface of each of the two traverse plates, the stopping edge extends in a first direction parallel to a ridge where the traverse plates intersect with the upright plate, and the locating protrusion extends in a second direction orthogonal to the first direction;
   the female interface comprises two horizontal plates parallel to each other and a vertical plate connecting to the two horizontal plates in a direction perpendicular to the horizontal plates, the two horizontal plates and the vertical plate form a first U-shape recess, and an inner surface of each of the two horizontal plates is provided with a stopping groove and a locating slot adapted for retaining the stopping edge and the locating protrusion respectively;

the male joint is adapted to engage with the female interface when the two traverse plates are inserted into the U-shape recess of the female interface, the stopping edge is located in the stopping groove, and the locating protrusion is located in the locating slot; and each of the frames has a first side and a second side adjacent to the first side, the first side is provided with the male joint, and the second side is provided with the female interface.

2. The assembled body according to claim 1, wherein the male joint and the female interface are detachable from the frames.

3. The assembled body according to claim 1, wherein the assembled body is realized by engaging the male joint of one frame with the female interface on another frame.

4. The assembled body according to claim 1, wherein the male joint is arranged on a male connecting part, and the female interface is arranged on a female connecting part.

5. The assembled body according to claim 4, wherein the male connecting part and the female connecting part are assembled on two adjacent frames respectively, and assembly of the two adjacent frames is realized by engaging the male joint of the male connecting part and the female interface on the female connecting part.

6. The assembled body according to claim 1, wherein each of two frames is assembled with the male joint, and assembly of the two frames is realized by engaging the male joints of the two frames with one common female interface.

7. The assembled body according to claim 1, wherein each of two frames is assembled with the female interface, and assembly of the two frames is realized by engaging the female interfaces of the two frames with one common male joint.

8. The assembled body according to claim 1, wherein the vertical plate connects to the two horizontal plates in a middle region of the horizontal plates to form two U-shape recesses extending in a line toward opposite directions.

9. The assembled body according to claim 1, wherein the female interface further comprises a second group of two parallel plates and a second vertical plate connecting to the two parallel plates to form a second U-shape recess, and the second U-shape recess is at an angle to the first U-shape recess.

10. The assembled body according to claim 9, wherein the angle is a vertical angle.

11. The assembled body according to claim 1, wherein the male joint further comprises a second group of two traverse plates parallel to each other and an upright plate connecting to the two traverse plates, and the second group of two traverse plates is at an angle to the first group of two traverse plates.

12. A male connector, comprising:
a first group of two traverse plates parallel to each other;
a second group of two traverse plates parallel to each other;
a first upright plate connecting to the first group of two traverse plates in a direction perpendicular to the first group of two traverse plates; and
a second upright plate connecting to the second group of two traverse plates,
wherein the second group of two traverse plates is at an angle to the first group of two traverse plates;
a stopping edge and a locating protrusion are provided on an outer surface of each of the first group of two traverse plates, the stopping edge extends in a first direction parallel to a ridge where the first group of two traverse plates intersect with the first upright plate, and the locating protrusion extends in a second direction orthogonal to the first direction; and
the male connector is adapted to engage with a female connector having a recess, wherein an inner surface of the recess is provided with a stopping groove and a locating slot adapted for retaining the stopping edge and the locating protrusion respectively.

13. A female connector, comprising:
a first group of two horizontal plates parallel to each other;
a second group of two parallel plates;
a first vertical plate connecting to the first group of two horizontal plates in a direction perpendicular to the first group of horizontal plates; and
a second vertical plate connecting to the second group of two parallel plates to form a second U-shape recess,
wherein the first group of two horizontal plates and the first vertical plate form a first U-shape recess, and the second U-shape recess is at an angle to the first U-shape recess;
an inner surface of each of the first group of two horizontal plates is provided with a stopping groove and a locating slot;
the female connector is adapted to engage with a male connector provided with a stopping edge and a locating protrusion, wherein the stopping edge extends in a first direction and the locating protrusion extends in a second direction orthogonal to the first direction; and
the stopping groove and the locating slot are adapted for retaining the stopping edge and the locating protrusion respectively once the female connector engages with the male connector.

* * * * *